(12) United States Patent
Hasieber et al.

(10) Patent No.: US 7,954,378 B2
(45) Date of Patent: Jun. 7, 2011

(54) ULTRASONIC SENSOR AND METHOD FOR DETERMINING A SEPARATION OF AN OBJECT FROM AN ULTRASONIC SENSOR

(75) Inventors: Oliver Hasieber, Bad Duerkheim (DE); Frank Schwiderski, Mannheim (DE)

(73) Assignee: Pepperl + Fuchs GmbH, Mannheim (DE)

( * ) Notice: Subject to any disclaimer, the term of this patent is extended or adjusted under 35 U.S.C. 154(b) by 618 days.

(21) Appl. No.: 11/959,766

(22) Filed: Dec. 19, 2007

(65) Prior Publication Data

US 2010/0170343 A1    Jul. 8, 2010

(30) Foreign Application Priority Data

Feb. 7, 2007  (EP) .................................. 07002623

(51) Int. Cl.
*G01N 29/38*    (2006.01)
*G01N 29/46*    (2006.01)
(52) U.S. Cl. ........................................... 73/597; 73/602
(58) Field of Classification Search ............. 73/602, 73/597, 629, 659
See application file for complete search history.

(56) References Cited

U.S. PATENT DOCUMENTS

| | | | |
|---|---|---|---|
| 5,197,019 A * | 3/1993 | Delon-Martin et al. | 600/443 |
| 5,923,282 A | 7/1999 | Honma et al. | |
| 6,345,683 B1 | 2/2002 | Gordon et al. | |

FOREIGN PATENT DOCUMENTS

| | | |
|---|---|---|
| DE | 42 04 414 C1 | 6/1993 |
| EP | 0 705 444 B1 | 3/1997 |
| EP | 1 460 396 A1 | 9/2004 |
| WO | WO 96/24027 | 8/1996 |
| WO | WO 01/46653 A1 | 6/2001 |

OTHER PUBLICATIONS

European Search Report No. EP 07 00 2623, Completion Date Apr. 24, 2007.

\* cited by examiner

*Primary Examiner* — Hezron Williams
*Assistant Examiner* — Rose M Miller
(74) *Attorney, Agent, or Firm* — John A. Merecki; Hoffman Warnick LLC

(57) ABSTRACT

The invention relates to a method for determining a separation, spacing or distance of an object from an ultrasonic sensor, in which ultrasonic pulses are emitted by a transducing or sensing element and in which ultrasonic pulses reflected by the object are detected by the same transducing element. According to the invention, the method is characterized in that there is a spectral analysis of the signal detected by the transducing element, that the multiple echo frequency attributed to multiple echoes of the ultrasonic pulses is determined in the spectrum of the detection signal and that on the basis of the multiple echo frequency the separation of the object from the ultrasonic sensor is determined. The invention also relates to an ultrasonic sensor for determining the separation of an object.

11 Claims, 4 Drawing Sheets

ULTRASONIC SENSOR AND METHOD FOR DETERMINING A SEPARATION OF AN OBJECT FROM AN ULTRASONIC SENSOR

FIELD OF THE INVENTION

The present invention relates to an ultrasonic sensor and a method for determining a separation, spacing or distance of an object from an ultrasonic sensor.

RELATED ART

In such a method, which is e.g. described in EP 0 705 444 B1, ultrasonic pulses are emitted by a transducing or corsing element and ultrasonic pulses reflected by an object are detected by the same transducing or corsing element.

Such an ultrasonic sensor is also described in EP 0 705 444 B1 and has a transducing element for emitting ultrasonic pulses and for the detection of the ultrasonic pulses reflected by the object, as well as an evaluating unit cooperating with the transducing unit for determining the separation of the object on the basis of the detected ultrasonic pulses.

In the hitherto known ultrasonic proximity switches the distance of an object is determined by means of the sound travel time of an ultrasonic pulse. In one-head systems, i.e. systems in which an ultrasonic transducer is used both as the transmitter and receiver, the ultrasonic transducer is activated or excited with the aid of a voltage and emits an ultrasonic pulse. In most sensors a piezoelectric system serves as the ultrasonic transducer. Following transducer excitation which takes place over a period of a few microseconds, the ultrasonic transducer is used as a receiver. The emitted ultrasonic pulse is reflected on an object and travels back to the sensor. The ultrasonic transducer transforms the echo pulse into an electrical voltage and on the basis of a measured sound travel time the separation of the object from the sensor is calculated.

One difficulty encountered in this method is that after switching off the excitation or transmitting voltage the ultrasonic transducer cannot immediately be used for receiving the echo, because the piezoelectric crystal decays over a finite time. Only after a few microseconds has the transmission pulse decayed to such an extent that an echo can be detected, cf. FIG. 2. The minimum object separation to be detected with a specific sensor is therefore limited downwards by the decay of the ultrasonic transducer.

It is admittedly known from EP 0 705 444 B1 that also the further echo signals are used for evaluation. However, this is not possible with the desired precision due to the frequently inadequate signal quality.

Further ultrasonic sensors are described in EP 0 316 511 A2, DE 101 03 936 C2, JP 2005 121 509 A and DE 103 23 063 A1.

SUMMARY OF THE INVENTION

An object of the invention is to provide a method for determining a separation of an object from an ultrasonic sensor and also an ultrasonic sensor permitting a reliable determination of the separation, even in the case of very small separations.

Advantageous variants of the inventive method and preferred developments of the inventive ultrasonic sensor form the subject matter of the dependent claims.

The method of the aforementioned type is inventively further developed in that a spectral analysis of a signal detected by the transducing element is performed, that a multiple echo frequency attributed to multiple echoes of the ultrasonic pulses is determined in the spectrum of the detection signal and that on the basis of the multiple echo frequency the separation of the object from the ultrasonic sensor is determined.

The ultrasonic sensor of the aforementioned type is inventively further developed in that the evaluation unit has a calculating unit for performing a spectral analysis of the signal detected by the sensing element, for determining a multiple echo frequency attributed to multiple echoes of the ultrasonic pulses in the spectrum of the detection signal and for determining the object separation on the basis of the multiple echo frequency.

The essence of the invention is considered to be that for the evaluation and determination of the separation evaluation takes place of the totality of the signal detected by the sensing element and in particular the multiple echoes. Thus, the information content of the detection signal of the sensing element is much more fully treated and rendered usable than in the prior art.

A further essential concept of the invention is that the detection signal of the sensing element is spectrally resolved and a multiple frequency belonging to the multiple echoes is determined in the spectrum. On the basis of this multiple echo frequency the object separation is then determined.

It is an essential advantage of the invention that with the aid of the novel evaluation the sensor close range can be significantly reduced, which gives rise to numerous new application possibilities for the ultrasonic sensor.

For spectral analysis preferably a fast Fourier transformation is performed. This is a well known and particularly rapid algorithm, which can be implemented with commercially available microcontrollers as calculating or computing units.

Appropriately a steady component and low frequencies of the detection signal are filtered out prior to the performance of spectral analysis. This can fundamentally take place with a suitable high-pass. Corresponding very high frequencies can also be filtered out. Alternatively following spectrum calculation a plausibility test can be performed, e.g. only frequencies in a given interval are taken into account. Typically the multiple echo frequency which is used for determining the object separation is in a range of 2 to 40 kHz.

Apart from a high intensity attributed to a steady component of the detection signal, the multiple echo frequency is normally the signal in the spectrum having the highest energy content and in the simplest case the highest peak. On the basis of the frequency position of this maximum and with the aid of the generally temperature-dependent speed of sound, the separation is determined. Thus, the precision of this determination is directly linked with the precision of the frequency determination, which can be increased by raising the number of points for the Fourier transformation. However, this leads to an increase in the calculation time.

Appropriately the spectrum analysis is performed for a baseband signal, i.e. an envelope curve of the sensing element. This offers the advantage that the frequency transformation and therefore the calculating capacity is concentrated on the ranges which are of interest, i.e. frequencies well below the baseband frequency.

In a particularly elegant manner the precision of the determination of the spectral position of the intensity maximum can be increased if in the range of the multiple echo frequency in the spectrum for a selected number of points around an initially determined intensity maximum a weighted average of the spectral position is formed, the spectral positions of the selected points being weighted with the intensities in each case determined there. This determination takes place in much the same way as the centre of gravity or centroid determination in the mechanical field.

Thus, without significantly increasing the calculating time, this permits a clear rise in the precision of the frequency and therefore separation determination. Thus, in the case of a fast Fourier transformation with only 256 points, with the aid of the centroid interpolation described here, this e.g. permits a roughly three times more precise separation determination than with a fast Fourier transformation with 1024 points without centroid interpolation.

For forming the weighted average in this method variant, particularly appropriately use is made of the maximum intensity point and on its right and left-hand sides in the spectrum in each case n, particularly n=2, 3 or 4 further points.

The further an object is removed from the sensor, the greater the time spacing of the multiple echoes and the fewer multiple echoes are determined in a measurement cycle. Thus, with regards to the frequency, its determination becomes ever less precise. The precision of the position determination therefore decreases with increasing spacing or separation, so that over large distances the spacing determination over the multiple echo frequency becomes unfavourable.

In a particularly preferred variant of the method and ultrasonic sensor according to the invention there is consequently a definition of a limit separation of the object from the ultrasonic sensor and above said limit separation the object separation is established using the transit time of the first echo, but below the limit spacing the object spacing is determined using the multiple echo frequency. In this method the advantages of the inventive evaluation of the multiple echo frequency are combined with the advantages of the standard threshold analysis, in which for the determination of the separation the first echo of the object is evaluated and compared with a threshold.

In such a method variant for the determination of separations greater than the limit separation, advantageously working takes place with a longer excitation period of the sensing element than for object separation smaller than the limit separation. Then the measurement above the limit separation can be performed with very well defined ultrasonic pulses and it is still ensured for the measurement below the limit separation that essentially all the multiple echoes can be utilized.

In order to be able to include all the usable information in a measurement, but whilst not unnecessarily lengthening the measurement time, appropriately a measurement time is specifically set for a particular ultrasonic sensor and through this a compromise can be reached between the measurement precision and the measurement duration. This can specifically take place for certain ultrasonic sensors, but also adapted to given measurement situations.

With respect to the components used in the ultrasonic sensor and evaluation electronics it is also appropriate if the precision of an analog-digital converter downstream of the sensing element is matched to the precision with which the Fourier transformation is performed. Tests have revealed that e.g. for a Fourier transformation over a length of 256 points, which corresponds to a signal-to-noise ratio S/N of 57.2 dB, the use of a 10 bit ADC is adequate. If this is taken into account, oversizing of components can be avoided and costs saved.

BRIEF DESCRIPTION OF THE DRAWINGS

Further advantages and characteristics of the inventive method and ultrasonic sensor are described in greater detail hereinafter relative to the attached drawings, wherein.

DETAILED DESCRIPTION OF THE INVENTION

Figure 1:
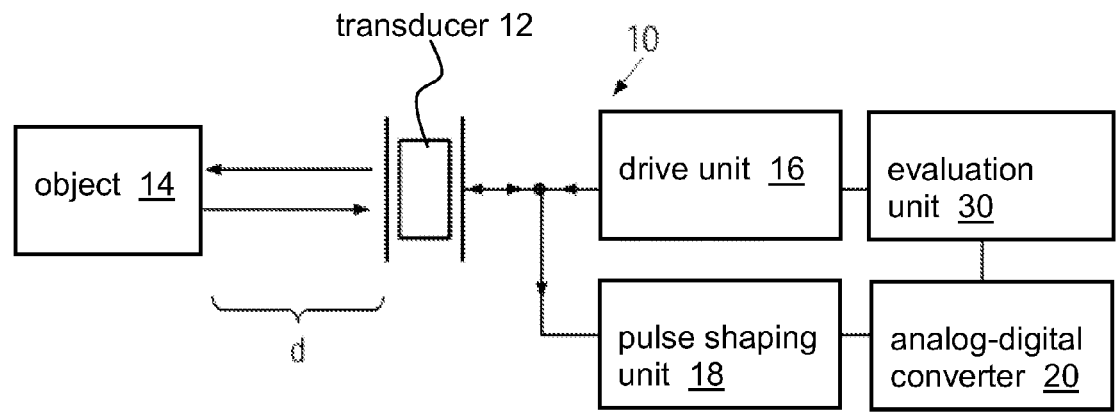
FIG. 1: A diagrammatic view of an inventive ultrasonic sensor.

FIG. 1 shows an inventive ultrasonic sensor 10, which has as essential components an ultrasonic transducer 12, a drive unit 16, a pulse shaping unit 18, an analog-digital converter 20 and an evaluation unit 30 with an inventively provided calculation unit. Equivalent components carry the same reference numerals in all the drawings.

The basic problem will be explained with reference to FIGS. 2 to 5.

Figure 2:
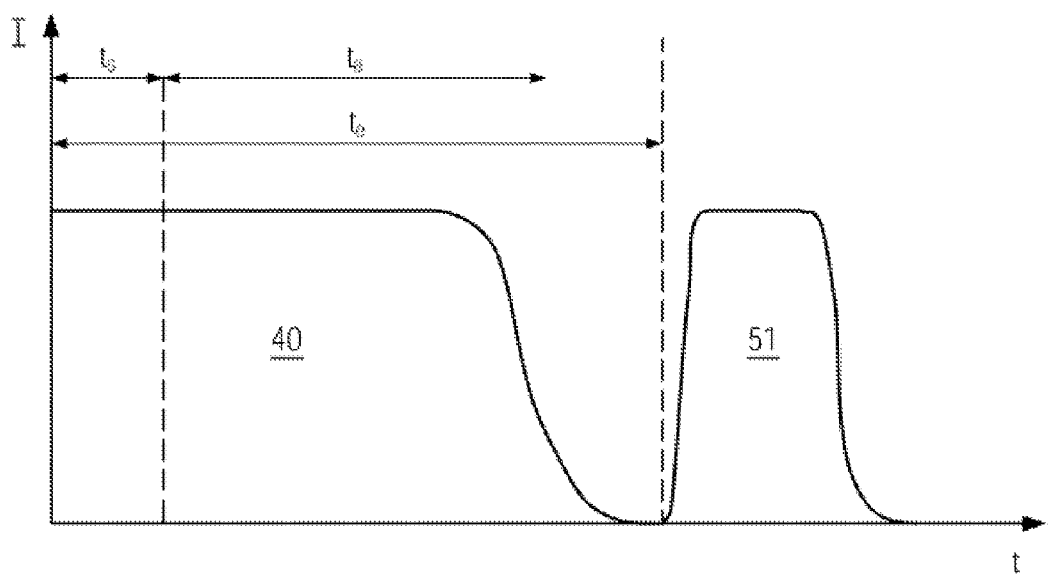
FIG. 2: A diagrammatic view of the graph of the transmitting and echo pulses in the case of one-head ultrasonic sensors.

FIG. 2 shows the typical curve of a vibration excitation of the ultrasonic transducer 12 plotted as the intensity in random units against the time axis. Firstly the transducer 12 is excited over a time interval $t_s$, so that an ultrasonic pulse is emitted. Due to the inertia of the masses vibrating in the solid the vibration does not end directly with the end of excitation by drive unit 16, i.e. not immediately after the end of time $t_s$. Instead the piezoelectric crystal continues to vibrate for a time $t_a$. Thus, there is a transmitting pulse 40 with a duration $t_s+t_a$. This pulse travels up to an object 14, whose distance d from the ultrasonic sensor 10 is to be determined, is reflected by the latter and then travels back to ultrasonic sensor 10. The returning pulse or echo pulse 51 again excites the piezoelectric crystal of transducing element 12 to vibrations, as is diagrammatically illustrated in FIG. 2. A time separation $t_e$ of pulses 40 and 51 corresponds to the transit time of the ultrasonic pulse from transducing element 12 to object 14 and back again. This transit time is also temperature-dependent due to the temperature dependence of the speed of sound.

Figure 3:
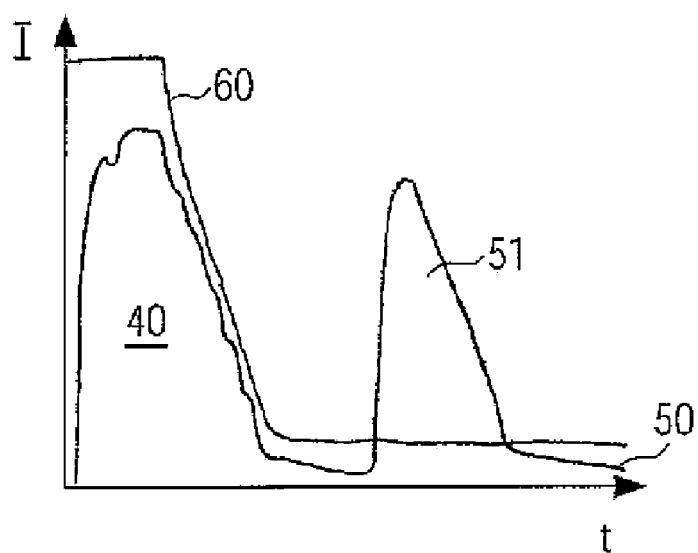
FIGS. 3 to 5: Examples for the signal curve of the detection signal curve for different object separations.
Figure 4:
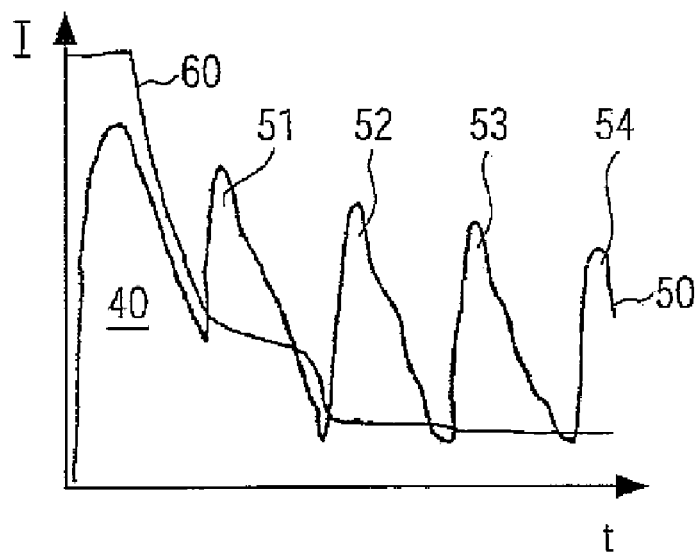
Figure 5:
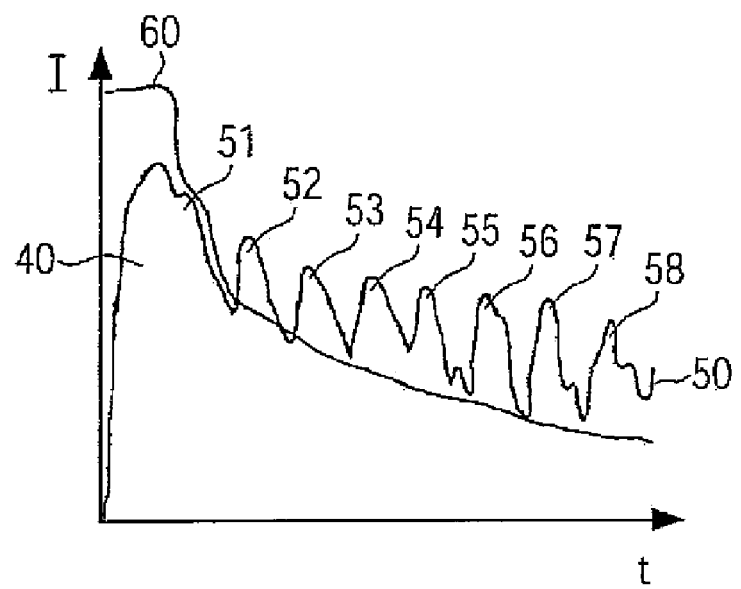

In the case of limited separations, the first echo 51 follows very closely in time the decay of transducing element 12 or even overlaps the latter. This is shown in FIGS. 3 to 5 and the signals 50 shown there are envelope curves or similarly demodulated baseband signals.

The pulse emitted by transducing element 12 is given the reference numeral 40. The echo signals caused by object 14 carry the reference numerals 51 to 58. Whereas in FIGS. 3 and 4 the first echo 51 is still clearly above a separation-dependently set threshold 60, this is no longer the case in FIG. 5. Thus, the first echo 51 can consequently not be used for separation determination. However, the measurement in FIG. 5 provides numerous further echo signals 52 to 58.

The basic idea of the invention is to evaluate the information contained in the multiple echoes occurring in the close range of an ultrasonic sensor. A received echo is reflected again at the ultrasonic transducer and passes through the path between ultrasonic sensors 10 and 14 a number of times. Thus, the resulting multiple echoes 51 to 58 contain the ultrasonic pulse transmit time $t_e$ from sensor 10 to object 14. According to the invention the information contained in the sequence of multiple echoes is evaluated by spectral analysis.

The evaluation of the baseband signal by a Fourier transformation, particularly a fast Fourier transformation FFT, is based on the fact that the multiple echoes 51 to 58 in the baseband produce a periodic signal. This periodicity can best be detected in the frequency range. Thus, the complete baseband signal is scanned and transformed into the frequency range. This is further explained in conjunction with FIGS. 6 and 7.

Figure 6:
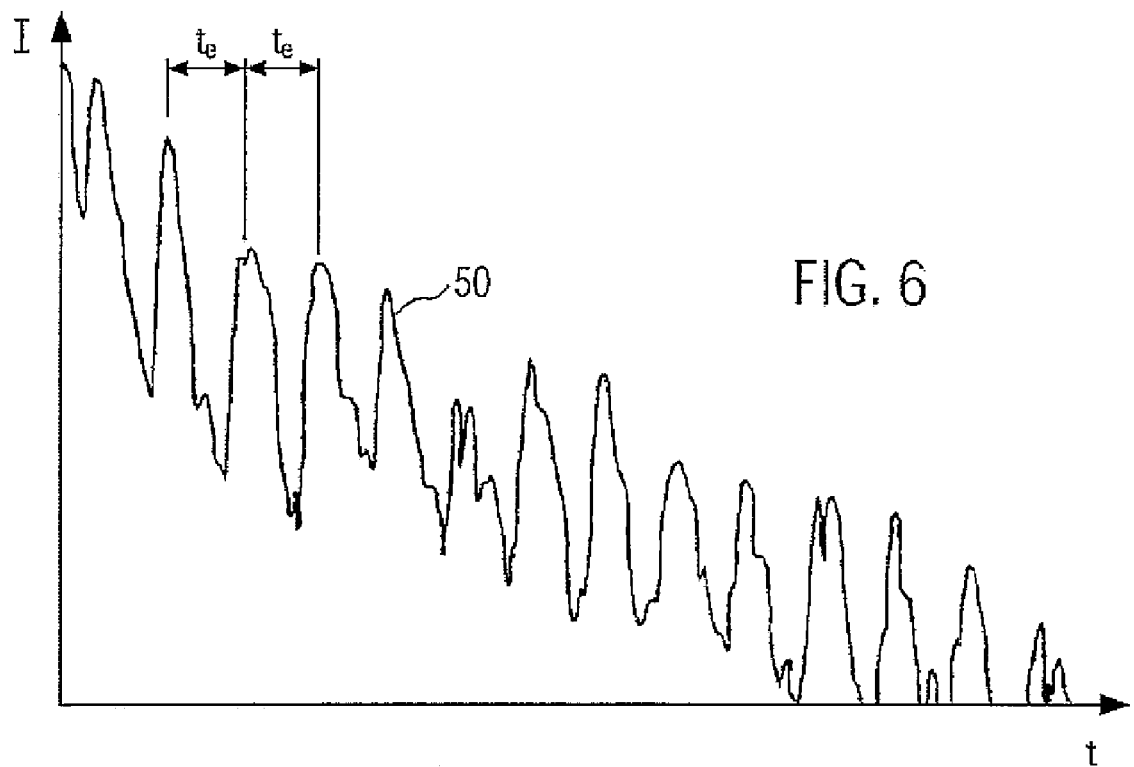
FIG. 6: A further example for the detection signal curve.

In FIG. 6 a further example of a detection signal 50 of transducing element 12 is plotted with a plurality of echo signals.

In principle, the evaluation of the measurement of FIG. 6 could also take place in the time domain. For this purpose the echoes of a measurement cycle can be detected with the aid of a microprocessor or microcontroller and the time separations determined. The transit time $t_e$ can now be obtained after using standard signal processing steps such as averaging and filtering, e.g. using a Gauss filter. With the aid of the formula $$d = t_e \times v_s(T)/2$$

the separation d of the object from the ultrasonic sensor can be calculated therefrom, $v_s$ being the temperature-dependent speed of sound. However, as can be seen in FIG. 6, the maxima of the echoes are not well resolved and the determination of the time $t_e$ can only take place imprecisely. This leads to a comparatively imprecise separation determination.

Figure 7:
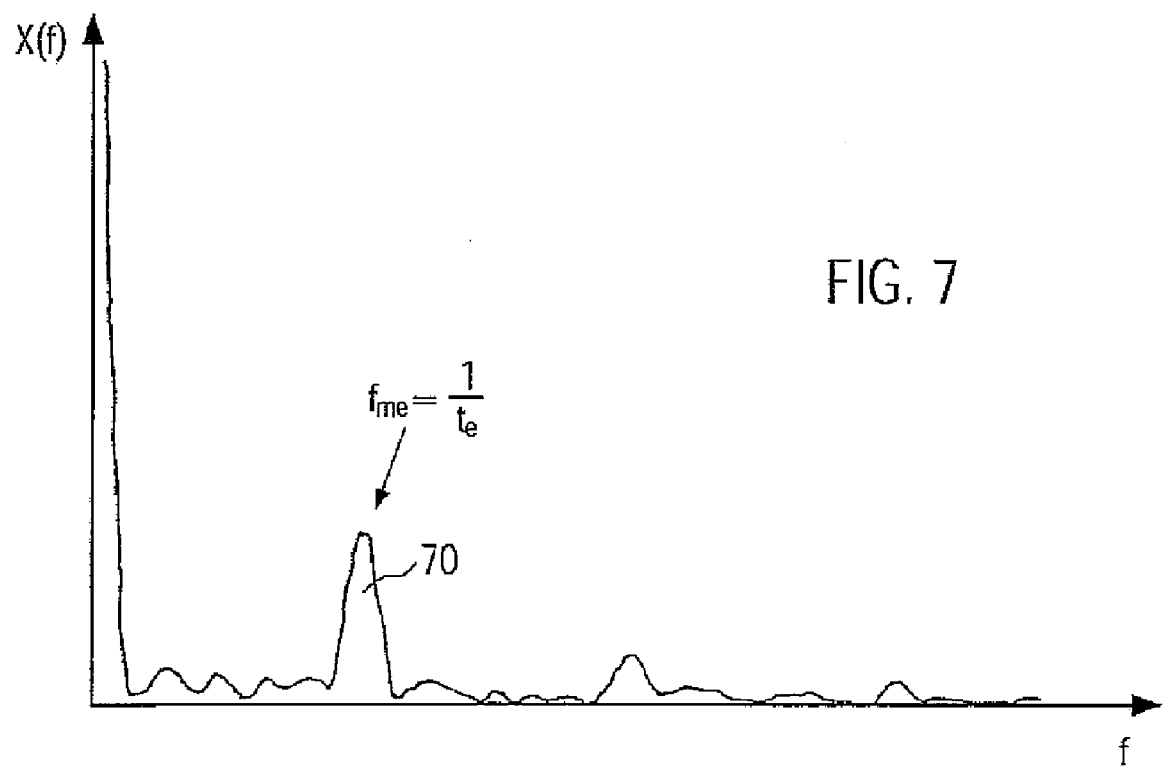
FIG. 7: A calculated frequency spectrum for the detection signal of FIG. 6.

This problem is obviated by the inventively provided Fourier transformation, whose result is diagrammatically represented in FIG. 7. An intensity X(f) in random units against a frequency axis is plotted therein. Apart from the high intensity around the zero or origin of the frequency axis, which can be attributed to a steady component of the detection signal, the frequency spectrum has a marked maximum 70. This maximum corresponds to the fundamental periodicity of the multiple echo in FIG. 6. As a result of the link between the sound transit time $t_e$ and the equivalent frequency $f_{me}$:

$$f_{me} = 1/t_e$$

with the frequency determined by Fourier transformation it is possible to calculate back the sound transit time and consequently also the object separation d. To determine the frequency $f_{me}$, the frequency with the highest energy content is sought in spectrum X(f). It must be borne in mind that the baseband signal contains a steady component and therefore the spectral component must be extracted by f=0. It is also possible to carry out filtering, e.g. using high-pass filters, prior to the transformation in the frequency range, in order to eliminate the steady or low frequency components in the baseband signal. Since with increasing object separation d, the frequency $f_{me}$ and also the number of multiple echoes, i.e. in all the information content, decreases, this method is particularly suitable for analysis at close range.

Figure 8:
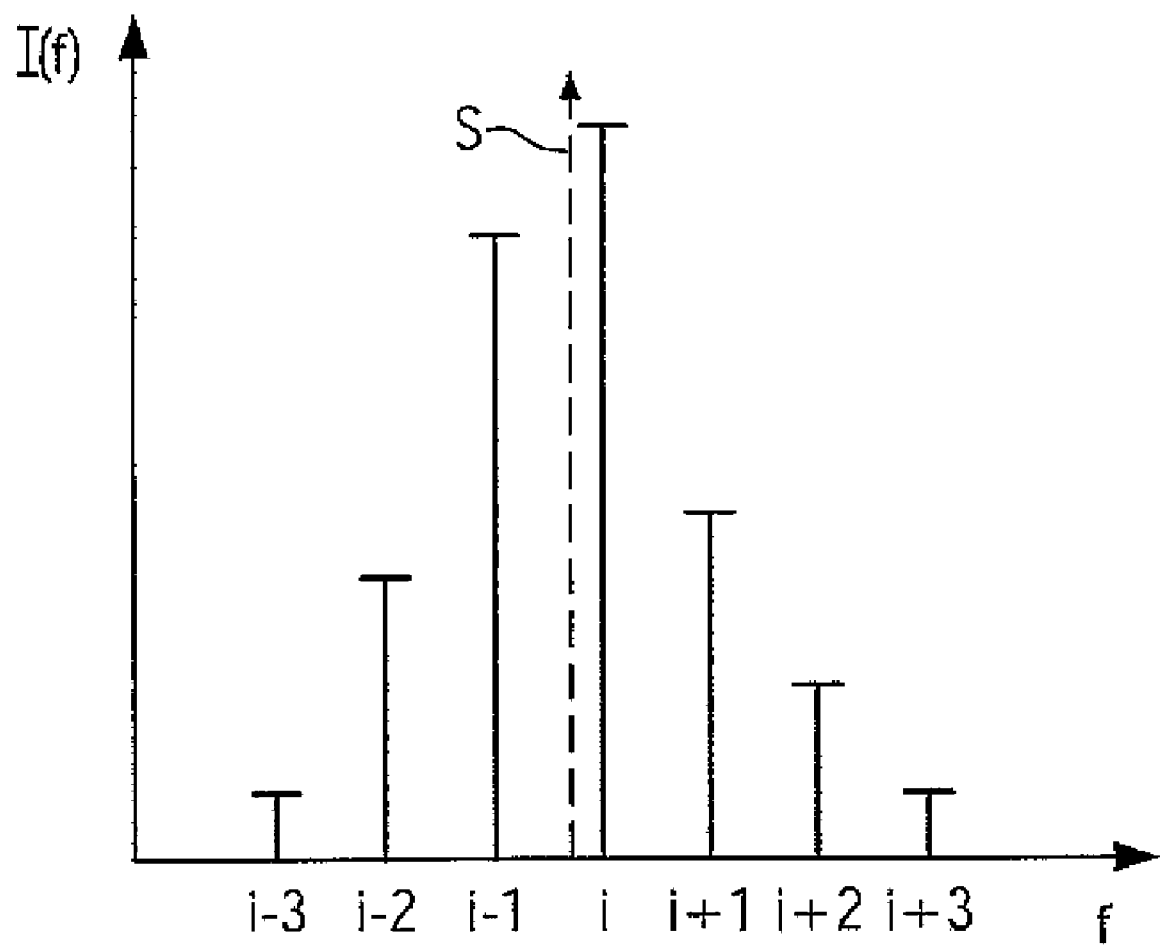
FIG. 8: A diagrammatic detail of a calculated spectrum for illustrating centroid interpolation.

A particularly preferred method variant, in which the frequency position of the strongest line in the frequency spectrum can be particularly accurately determined, will be described relative to FIG. 8. The latter diagrammatically shows a detail from a calculated Fourier spectrum for 7 points. The maximum intensity is established for the frequency position i. FIG. 8 directly shows the asymmetrical distribution of the intensities of the 3 points to the right or left of position i. This means that in reality the maximum intensity frequency position is between points i and i−1. This effective maximum position can be approximated by a method similar to centroid determination in the mechanical field. For this centroid interpolation a weighted average is formed for a selected number of points, the position in the spectrum being in each case weighted with the intensity established there. If this is e.g. performed for the points shown in FIG. 8, a value S is obtained and is represented as a broken line arrow in FIG. 8. For calculating the centroid interpolation it is appropriate to use the maximum intensity point and also on the right and left-hand sides in the spectrum in each case a small number of further points, e.g. n=2, 3 or 4. The precision of the position determination can be increased by roughly a factor of 3 in the case of a frequency spectrum calculated for 256 points.

The present invention provides a novel method for the determination of a separation between an object and an ultrasonic sensor, as well as a novel ultrasonic sensor, with which it is possible to greatly shorten the close range and therefore bring about a marked increase in the functionality of ultrasonic sensors.

The invention claimed is:

1. A method for determining a separation of an object from an ultrasonic sensor, the method comprising:
   emitting ultrasonic pulses from the ultrasonic sensor;
   detecting, by the ultrasonic sensor, multiple echoes of the ultrasonic pulses reflected by the object;
   performing a spectral analysis on the multiple echoes to determine a multiple echo frequency in a frequency spectrum corresponding to the multiple echoes; and
   determining the separation of the object based on the multiple echo frequency.

2. The method according to claim 1, wherein performing the spectral analysis further comprises:
   performing a fast Fourier transformation on the multiple echoes to determine the multiple echo frequency.

3. The method according to claim 2, wherein determining the multiple echo frequency further comprises:
   determining an intensity maximum in the frequency spectrum;
   selecting a number of spectral positions in the frequency spectrum around the intensity maximum;
   determining an intensity for each of the selected number of spectral positions in the frequency spectrum; and
   determining a weighted average of the intensity maximum and the intensities at the selected spectral positions.

4. The method according to claim 3, wherein selecting a number of spectral positions further comprises:
   selecting n spectral positions to a right and left of the intensity maximum in the frequency spectrum, wherein n=2, 3, or 4.

5. The method according to claim 1, further comprising:
   defining a separation time threshold; and
   determining a transit time of a first echo of the multiple echoes from the object to the ultrasonic transducer;
   wherein the separation of the object is determined using the transit time of the first echo when the transit time of the first echo is larger than the separation time threshold, and wherein the separation of the object is determined using the multiple echo frequency when the transit time of the first echo is smaller than the separation time threshold.

6. The method according to claim 5, further comprising:
   exciting a transducing element of the ultrasonic sensor for a first excitation period when the transit time of the first echo is larger than the separation time threshold; and
   exciting the transducing element of the ultrasonic sensor for a second excitation period when the transit time of the first echo is smaller than the separation time threshold;
   wherein the first excitation period is greater than the second excitation period.

7. The method according to claim 1, further comprising:
   filtering the frequency spectrum before determining the multiple echo frequency.

8. The method according to claim 1, wherein the spectral analysis is performed on a baseband signal of a transducing element of the ultrasonic sensor.

9. An ultrasonic transducer for determining a separation of an object from the ultrasonic transducer, comprising:
- a transducing element for emitting ultrasonic pulses and for detecting multiple echoes reflected by the object; and
- an evaluation unit cooperating with the transducing unit for determining the separation of the object based on the multiple echoes;
- wherein the evaluation unit further comprises a calculating unit for:
  - performing a spectral analysis on the multiple echoes;
  - determining a multiple echo frequency in a frequency spectrum corresponding to the multiple echoes; and
  - determining the separation of object based on the multiple echo frequency.

10. The ultrasonic transducer according to claim 9, wherein the evaluation unit is a microcontroller with an integrated fast Fourier transformation functionality.

11. The ultrasonic transducer according to claim 10, wherein a precision of an analog-digital converter downstream of the transducing element is matched to a precision of the Fourier transformation.

* * * * *